United States Patent

[11] 3,624,135

[72] Inventor Mahmoud S. Kablaoui
Wappingers Falls, N.Y.
[21] Appl. No. 15,300
[22] Filed Feb. 27, 1970
[45] Patented Nov. 30, 1971
[73] Assignee Texaco Inc.
New York, N.Y.

[54] PREPARATION OF BENZENE DIACETATES
6 Claims, No Drawings

[52] U.S. Cl. .................................................... 260/479 R,
260/621 G, 260/625
[51] Int. Cl. ..................................................... C07c 69/16
[50] Field of Search ........................................... 260/479 R

[56] References Cited
OTHER REFERENCES
Doering et al., J. Am. Chem. Soc., Vol. 71, pages 2221–6 (1949)

*Primary Examiner*—James A. Patten
*Attorneys*—Thomas H. Whaley, Carl G. Ries and Robert A. Kulason ABSTRACT: A method of preparing a benzene diacetate of the formula:

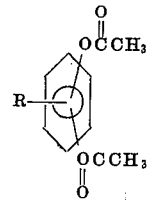

where R is alkyl or hydrogen comprising contacting a cyclohexanedione of the formula

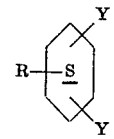

where R is as heretofore defined and Y is keto oxygen with a mixture of concentrated sulfuric acid and acetic anhydride.

PREPARATION OF BENZENE DIACETATES

BACKGROUND OF THE INVENTION

The alkylated and nonalkylated benzene diacetate products contemplated herein are readily converted by standard hydrolysis techniques to the commercially valuable dihydroxybenzenes which are useful among others things as drilling mud dispersants (alkylated species) and as pharmaceutical precursors.

In the past, the preparation of dihydroxybenzenes via the aromatization of cyclohexanediones had been disappointing, specifically in the area of obtaining satisfactory yields. One prior method called for contacting cyclohexadiones with a palladium-on-carbon catalyst. In another similar procedure Raney nickel in a sodium hydroxide solution was employed as catalyst.

DESCRIPTION OF THE INVENTION

I have discovered and this constitutes my invention a method of converting cyclohexanediones and alkylated cyclohexanediones in high yields into corresponding benzene diacetates and alkylated benzene diacetates. The process is rapid and highly selective, inexpensive and high yields are accompanied by ease of isolation of the diacetate product. Further, with negligible loss the diacetate product can be easily converted into the corresponding dihydroxybenzenes via standard hydrolysis techniques.

Specifically, benzene diacetate of the general formula:

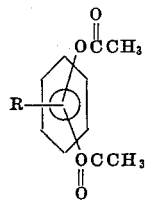

where R is hydrogen or alkyl of from 1 to 20 carbons is prepared by contacting a cyclohexanedione of the formula:

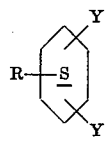

where R is as heretofore defined and Y is keto oxygen with a mixture of concentrated sulfuric acid and acetic anhydride utilizing a mole ratio of said sulfuric acid to said cyclohexanedione of between about 0.1:1 and 10.0:1 and more, preferably between about 0.5:1 and 1.5:1 and a mole ratio of said acetic anhydride to said sulfuric acid of between about 1:1 and 100:1 or more, preferably between about 5:1 and 20:1. The reaction temperature is advantageously at least about 30° C. and preferably the refluxing temperature of the reaction medium when said refluxing temperature is over 75° C., e.g., 80°–150° C. Reaction temperatures up to about 200° C. or more are contemplated. If temperatures above the boiling point of reactants and/or diluent are utilized superatmospheric pressure is required. The reaction is normally conducted for between about 0.5 and 4 hours or until the economics of product yield versus reaction time dictates reaction termination. Under preferred conditions, the reaction is conducted under conditions of agitation and an inert atmosphere such as nitrogen.

If necessary, diluent may be employed. Suitable examples of such diluents are excess acetic anhydride or other volatilizable solvents such as acetic acid, toluene, benzene, heptane, hexane, chloroform, carbon tetrachloride, chlorobenzenes and cyclohexane. The diluents (if employed) normally constitute between about 25 and 90 wt. percent of the reaction mixture.

The benzene diacetate product can be recovered from the resultant reaction mixture by standard means. One such standard means of recovery comprises first removing excess acetic anhydride and acetic acid by product via fractional distillation, quenching the residue in water wherein the water content in the resultant mixture was between about 10 and 90 wt. percent, said quenching conducted at a temperature desirably between about 0° and 50° C., extracting the aqueous mixture with a water immiscible volatilizable solvent for the diacetate, washing the solvent layer with aqueous alkali base, e.g., 0.1 to 7 wt. percent sodium bicarbonate, subjecting the washed solvent solution to distillation to remove the volatilizable solvent leaving the purified benzene diacetate product as residue.

The conversion of the benzene diacetate product to dihydroxybenzene derivatives of the general formula:

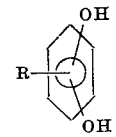

where R is as heretofore defined, can be accomplished by hydrolyzing said benzene diacetate by contacting the benzene diacetate with aqueous (e.g. 0.1 to 1 wt. percent) mineral acid (e.g., HCL) utilizing a benzene diacetate to aqueous acid weight ratio of between about 1:2 and 1:100 at a temperature between about 0° and 100° C., most preferably under reflux conditions, extracting the formed dihydroxybenzene from the aqueous acid solution with a water immiscible volatilizable solvent for said dihydroxybenzene, and separating the dihydroxybenzene product from the solvent, e.g., via fractional distillation.

Suitable examples of the volatilizable diluent contemplated herein in a recovery purification of the benzene diacetate products and dihydroxybenzene derivatives are ether, benzene and chloroform.

By the term "concentrated sulfuric acid" hereinbefore and hereinafter recited, an acid composition consisting of between 95 and 100 wt. percent $H_2SO_4$ and 0 to 5 wt. percent $H_2O$ is intended.

One of the critical features of the method of the invention is the employment of the acetic anhydride-concentrated sulfuric acid combination. If other mineral acids such as concentrated hydrochloric and concentrated phosphoric acid are substituted for sulfuric acid as defined no aromatization takes place and consequently no benzene diacetate is formed. The same is true if acetic anhydride is replaced with its hydrated form, acetic acid.

Further criticality is demonstrated in the quantities of dione reactant and sulfuric acid and acetic anhydride components in the acid mixture. For example, when sulfuric acid is substantially less than the minimum heretofore set forth aromatization does not occur and the product formed is exclusively an undesired acetoxycyclohexenone. The increase in undesired acetoxycyclohexenone yield increases proportionally with the decrease of sulfuric acid to dione reactant mole ratio.

Examples of the dione reactants contemplated are 1,2-cyclohexanedione, 1,3-cyclohexanedione, 1,4-cyclohexanedione, 2-methyl-1,3-cyclohexanedione, 3-methyl-1,2cyclohexanedione, 3hexyl-1,4-cyclohexanedione, 2,5-didecyl-1,3-cyclohexanedione. Their corresponding benzene diacetates are catechol diacetate, resorcinol diacetate, hydroquinone diacetate, 2-methylresorcinol diacetate, 3-methylcatechol diacetate, 3-hexylhydroquinone diacetate, 2,5-didecylresorcinol diacetate. The corresponding dihydroxybenzenes are catechol, resorcinol, hydroquinone, 2methylresorcinol, 3-methylcatechol, 3-hexylhydroquinone and 2,5-didecylresorcinol.

The preferred 1,2-cyclohexanedione reactants can be advantageously prepared by contacting a cyclohexanone of the general formula:

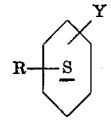

where R and Y are as heretofore defined with ferric chloride in the presence of aqueous acetic acid at a temperature between about 30° and 120° C. The concentration of the acetic acid employed is between about 20 and 80 wt. percent and normally constitutes between about 5 and 30 wt. percent of the reaction mixture. The mole ratio of ketone to ferric chloride is generally between about 1:1 and 1:4. This oxidation converts the ketone into a major portion of 1,2-cyclohexanedione of the formula;

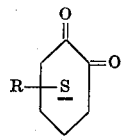

where R is as heretofore defined. The aforedescribed method of forming the dione reactant is particularly well suited for integration with the method of the invention and/or subsequent hydrolysis to produce dihydroxybenzene products.

The following examples further illustrate the invention but are not to be construed as limitations thereof.

EXAMPLE I

To a 3-necked 300 ml. pyrex flask equipped with a magnetic stirrer, gas sparger and thermometer, there were charged 3 grams of 1,3-cyclohexandione, 2,65 grams of 96 wt. percent sulfuric acid and 75 mls. of acetic anhydride. The condenser was connected to a trap immersed in a bath maintained at about −40° C. The reaction mixture was heated to reflux (140° C.) and dry nitrogen was passed through the mixture at a rate of 140 ml./minute for a period of 1 hour. At the end of the reaction period the reaction mixture was cooled to room temperature and the resultant solution was added to 150 ml. of ice water and stirred for 178 hour to decompose the excess acetic anhydride. It was then extracted with ether (4×50 ml.). The ether layers were combined and washed (2×50 ml.) with saturated aq. sodium bicarbonate (about 7 wt. percent $NaHCO_3$), once with 50 ml. of saturated aqueous sodium chloride dried and the ether stripped to give a residue. The residue weighed 4.8 grams and was identified as resorcinol diacetate characterized by the formula:

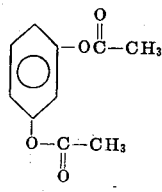

representing a yield of 93 wt. percent.

The recovered resorcinol diacetate was then hydrolyzed and 2.6 grams of resorcinol were recovered representing a yield of 90 wt. percent based on the original dione reactant. The hydrolysis and resorcinol recovery procedures in detail are as follows:

Resorcinol diacetate in an amount of 4.8 grams was charged to a flask equipped with a magnetic stirrer and a condenser. To the flask was charged 50 ml. of water, 1 ml. of contracted HCl and the mixture was refluxed for 2 hours. The mixture was cooled to room temperature and extracted with (4×50 ml.) ether. Ether extracts combined and washed with saturated aqueous $NaHCO_3$ (2×50 ml.), with 50 ml. of saturated sodium chloride, dried with magnesium sulfate and the ether was striped to get 2.6 grams of resorcinol.

EXAMPLE II

To a 200 mls. three-necked pyrex flask equipped with a magnetic stirrer, glass sparger and a condenser there was charged 3.8 grams of 3-methyl-1,2-cyclohexanedione, 100 ml. acetic anhydride and 3.2 grams of 96 wt. percent sulfuric acid. The resultant mixture was refluxed (140° C.) for 1 hour. At the end of the hour period the reflux mixture was cooled to room temperature A product residue weighing 5.8 grams was isolated in accordance with the recovery procedure outlined for the diacetate recovery in example I. The 5.8 grams of residue ware analyzed by gas chromatography and determined to be 3-methylcatechol diacetate characterized by formula:

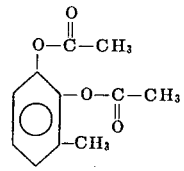

representing a yield of 93 wt. percent.

The recovered 3-methylcatechol diacetate was hydrolyzed and 3.4 grams of 3-methylcatechol were percent representing a yield of 90 wt. percent basis said initial dione reactant. The hydrolysis and dihydroxybenzene recovery procedures in detail were as outlined in example I.

EXAMPLE III

To a 200 mls. three-necked flask equipped with a magnetic stirrer, gas sparger and a condenser there was charged 3.0 grams of 2-methyl-1,3-cyclohexanedione, 50 mls. acetic anhydride and 2.3 grams of 96 wt. percent sulfuric acid. The resultant mixture was refluxed for one hour. At the end of the hour the reaction mixture was worked up as in example I. The residue obtained was 4.60 grams of 2-methylresorcinol diacetate characterized by the formula:

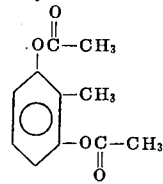

representing a yield of 93 wt. percent.

The above residue was hydrolyzed as in example I and 2.70 grams of 2-methylresorcinol were recovered representing a yield of 92 wt. percent based on the original dione reactant.

EXAMPLE IV

This example illustrates a procedure for producing a dihydroxybenzene from a cyclohexanone wherein the method of the invention is integrated therein.

To a 200 mls. three-necked flask equipped with magnetic stirrer, gas sparger and condenser there was charged 3.8 grams of 2-methylcyclohexanone, 30 ml. of acetic acid, 25 grams of anhydrous ferric chloride and 30 ml. of distilled water. The resultant mixture was refluxed for 2 hours, cooled to room temperature and the solids formed (ferrous salts) were removed via filtration. To the filtrate 100 ml. of ether were added and the resultant water layer was separated and washed with 200 ml. of ether. The combined ether layers were dried and ether distilled to give a first residue weighing 40 grams. Chromatographic analysis of the 40 gram first residue determined it to be essentially a 50—50 mixture of 3-methylcyclohexanone and 3-methylcyclohexane-1,2-dione in acetic acid. To the 40 gram first residue there was added 100 ml. of acetic anhydride and 5 grams of 96 wt. percent sulfuric acid. The reaction mixture was refluxed for 1 hour. The resultant mixture was worked up as in example II and 4 grams (95 wt. percent purity) of 3-methylcatechol diacetate was recovered. The diacetate was hydrolyzed as in example II and 2.2 grams of 3-methylcatechol were recovered representing a yield of 52 wt. percent based on the initial 2-methylcyclohexanone reactant.

EXAMPLE V

The procedure of example I was repeated with the exception that only 0.08 gram (0.8 mole of concentrated sulfuric acid was utilized in the first stage. At the end of the refluxing period, the product was worked up and the residue weighed 3.9 grams and was determined to be 3-acetoxycyclohex-2-eneone.

EXAMPLE VI

This example illustrates the criticality of the concentrated sulfuric acid-acetate anhydride combination.

The procedure of example I was repeated in two comparative runs. In run A 2.5 grams of 40 wt. percent hydrochloric acid was substituted for sulfuric acid. In run B 75 ml. of glacial acetic acid was substituted for acetic anhydride. Chromatographic analysis determined no aromatic diacetate product was formed.

I claim:

1. A method of preparing benzene diacetate of the formula:

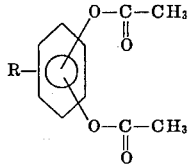

where R is hydrogen or alkyl of from one to 20 carbons comprising contacting cyclohexanedione of the formula:

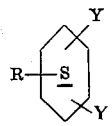

where R is as heretofore defined and Y is a keto oxygen with a mixture of concentrated sulfuric acid and acetic anhydride at a temperature of at least about 30° C. in a first mole ratio of said sulfuric acid to said cyclohexanedione of at least about 0.10:1 and a second mole ratio of acetic anhydride to said sulfuric acid at least about 1:1.

2. A method in accordance with claim 1 wherein said first mole ratio is between about 0.5:1 and 1.5:1, said second mole ratio is between about 5:1 and 20:1 and said temperature is between about 80° and 150° C.

3. A method in accordance with claim 2 wherein said dione is 3-methyl-1,2-cyclohexanedione, and said benzene diacetate is 3-methylcatechol diacetate.

4. A method in accordance with claim 2 wherein said cyclohexanedione is 1,3-cyclohexanedione and said benzene diacetate is resorcinol diacetate.

5. A method in accordance with claim 2 wherein said cyclohexanedione is 2-methyl-1,3-cyclohexanedione and said benzene diacetate is 2-methylresorcinol diacetate.

6. A method in accordance with claim 2 wherein said cyclohexanedione is of the formula:

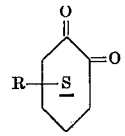

where R is as heretofore defined and is prepared by contacting a cyclohexanone of the formula:

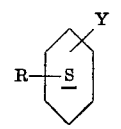

where R and Y are as heretofore defined with ferric chloride and between about 30 and 80 wt. percent aqueous acetic acid utilizing a mole ratio of cyclohexanone to ferric chloride of between about 1:1 and 1:4 at a temperature between about 30° and 120° C., and recovering the 1,2-cyclohexanedione from the resultant reaction mixture.